(12) United States Patent
Chapple

(10) Patent No.: US 12,099,369 B2
(45) Date of Patent: *Sep. 24, 2024

(54) AERIAL VEHICLE

(71) Applicant: Bayer Aktiengesellschaft, Leverkusen (DE)

(72) Inventor: Andrew Charles Chapple, Lagenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 560 days.

This patent is subject to a terminal disclaimer.

(21) Appl. No.: 17/310,143

(22) PCT Filed: Jan. 15, 2020

(86) PCT No.: PCT/EP2020/050872
§ 371 (c)(1),
(2) Date: Jul. 20, 2021

(87) PCT Pub. No.: WO2020/152002
PCT Pub. Date: Jul. 30, 2020

(65) Prior Publication Data
US 2022/0061303 A1    Mar. 3, 2022

(30) Foreign Application Priority Data

Jan. 21, 2019 (EP) .................................... 19152713
Jan. 24, 2019 (EP) .................................... 19153511

(51) Int. Cl.
*G05D 1/00*    (2024.01)
*A01M 7/00*    (2006.01)
(Continued)

(52) U.S. Cl.
CPC ............ *G05D 1/042* (2013.01); *A01M 7/0085* (2013.01); *A01M 7/0089* (2013.01); *B05B 12/08* (2013.01);
(Continued)

(58) Field of Classification Search
CPC ..... B05B 12/08; B05B 12/124; B05B 12/126; B05B 13/005; A01M 7/0085;
(Continued)

(56) References Cited

U.S. PATENT DOCUMENTS

| 5,190,218 A | 3/1993 | Kayser et al. |
|---|---|---|
| 2007/0145191 A1 | 6/2007 | Smith et al. |

(Continued)

FOREIGN PATENT DOCUMENTS

| CN | 206885357 U | 1/2018 |
|---|---|---|
| CN | 108812591 A | 11/2018 |

(Continued)

OTHER PUBLICATIONS

International Search Report mailed Apr. 21, 2020 for PCT Application No. PCT/EP2020/050872 filed Jan. 15, 2020, 2 pages.

*Primary Examiner* — Darren W Gorman
(74) *Attorney, Agent, or Firm* — Morrison & Foerster LLP

(57) ABSTRACT

An aerial vehicle includes a liquid chemical tank, at least one spray unit, a plurality of sensors, a processing unit, and an output unit. The processing unit is configured to generate a spray record for an environment within which the aerial vehicle is operating, the spray record comprising: information over a time period of at least one spray condition relating to one or more of the at least one spray unit for the aerial vehicle operating within the environment over the time period, the determined air movement direction relative to the projection of the fore-aft axis onto the ground over the (Continued)

time period, and the determined air movement speed relative to the ground over the time period. The output unit is configured to output the spray record.

14 Claims, 2 Drawing Sheets

(51) Int. Cl.
*B05B 12/08* (2006.01)
*B05B 12/12* (2006.01)
*B05B 13/00* (2006.01)
*B64D 1/18* (2006.01)

(52) U.S. Cl.
CPC .......... *B05B 12/124* (2013.01); *B05B 12/126* (2013.01); *B05B 13/005* (2013.01); *B64D 1/18* (2013.01); *G05D 1/0808* (2013.01); *G05D 1/101* (2013.01); *G05D 1/106* (2019.05)

(58) Field of Classification Search
CPC ... A01M 7/0089; G05D 1/042; G05D 1/0808; G05D 1/101; G05D 1/106; B64D 1/18; B64U 2101/45
See application file for complete search history.

(56) References Cited

U.S. PATENT DOCUMENTS

| | | | | |
|---|---|---|---|---|
| 2011/0139899 | A1 | 6/2011 | Robinson, Jr. | |
| 2012/0169504 | A1* | 7/2012 | Hillger | A01M 7/0089 340/603 |
| 2016/0368011 | A1 | 12/2016 | Feldhaus et al. | |
| 2017/0350707 | A1* | 12/2017 | Hillger | G01C 21/20 |
| 2018/0243774 | A1 | 8/2018 | Davis et al. | |
| 2018/0319499 | A1* | 11/2018 | Holly | B64C 39/024 |
| 2018/0319500 | A1* | 11/2018 | Grimm | B05B 15/14 |
| 2019/0047009 | A1* | 2/2019 | Barker | B05B 12/12 |
| 2019/0047010 | A1* | 2/2019 | Barker | B05B 12/16 |
| 2019/0049360 | A1* | 2/2019 | Crafton | A01C 23/047 |
| 2020/0108931 | A1* | 4/2020 | Zhou | B64C 13/18 |

FOREIGN PATENT DOCUMENTS

| | | | |
|---|---|---|---|
| JP | 2008132838 | A | 6/2008 |
| WO | 2017134658 | A1 | 8/2017 |
| WO | 2018216214 | A1 | 11/2018 |

* cited by examiner

AERIAL VEHICLE

CROSS REFERENCE TO RELATED APPLICATIONS

This application is a national stage application under 35 U.S.C. § 371 of International Application No. PCT/EP2020/050872, filed internationally on Jan. 15, 2020, which claims the benefit of priority to European Application Nos. 19152713.4 filed Jan. 21, 2019, and 19153511.1 filed Jan. 24, 2019.

FIELD OF THE INVENTION

The present disclosure relates to an aerial vehicle.

BACKGROUND OF THE INVENTION

Spray drift caused by wind and wind gusts is a major problem in agricultural production. The spray droplets drift onto non target surfaces, such as within sensitive zones, onto bystanders, onto water bodies, and onto neighboring fields. Spraying can only occur in certain relatively benign conditions, when the wind speed is low and because farmers cannot prove that they were operating responsibly.

SUMMARY OF THE INVENTION

It would be advantageous to have a way of mitigating the effects of spray drift.

In an aspect, there is provided an aerial vehicle, comprising:
 a liquid chemical tank;
 at least one spray unit;
 a plurality of sensors;
 a processing unit; and
 an output unit, The liquid chemical tank is configured to hold a liquid chemical. The at least one spray unit is configured to spray the liquid chemical. At least one sensor of the plurality of sensors is configured to measure a speed of the aerial vehicle relative to the ground. At least one sensor of the plurality of sensors is configured to measure an air movement direction relative to the aerial vehicle with respect to a fore-aft axis of the aerial vehicle. At least one sensor of the plurality of sensors is configured to measure an air movement speed relative to the aerial vehicle. The processing unit is configured to determine an air movement direction relative to a projection of the fore-aft axis onto the ground and determine an air movement speed relative to the ground, the determination comprising utilization of the speed of the aerial vehicle, the air movement direction relative to the aerial vehicle with respect to the fore-aft axis of the aerial vehicle and the air movement speed relative to the aerial vehicle. The processing unit is configured to generate a spray record for an environment within which the aerial vehicle is operating. The spray record comprises: information over a time period of at least one spray condition relating to one or more of the at least one spray unit for the aerial vehicle operating within the environment over the time period, the determined air movement direction relative to the projection of the fore-aft axis onto the ground over the time period, and the determined air movement speed relative to the ground over the time period. The output unit is configured to output the spray record.

In this manner, an audit record of spraying is recorded that records how a spray vehicle was operating and the environmental conditions that leads to drift, wind direction and speed is recorded, and this information is recording taking into account wherein within an environment (such as a field, that can contain a crop) spraying occurred.

Thus, by being able to provide accurate audit information relating to how spraying has progressed, the farmer can spray over an increased range of environmental conditions.

In an example, at least one sensor of the plurality of sensors is configured to determine a geographical location of the aerial vehicle, and wherein the spray record comprises the geographical location of the aerial vehicle over the time period.

In an example, the aerial vehicle comprises an input unit. The input unit is configured to receive spray requirement information for the environment. The spray requirement information comprises at least one spray requirement condition relating to one or more of the at least one spray unit as a function of air movement speed and air movement direction and geographical location in the environment. The spray record comprises the at least one spray condition relating to the one or more of the at least one spray unit as a function of geographical location over the time period and the at least one spray requirement condition relating to the one or more of the at least one spray unit as a function of geographical location over the time period.

Thus, information such as a spray map is provided that indicates how one needs to spray, and that takes into account the weather conditions. Thus, for example at a field border when the wind is blowing into the field, spraying can be conducted in a normal manner. However, if the wind was to move into a direction towards the boundary mitigating action is required, such as spraying in a manner to minimize drift. Furthermore, if the wind speed increased in the direction of the boundary then further mitigating action can be required, and indeed ultimately if the position of spraying and the wind speed direction and speed are such that unwanted drift would be expected to occur, a requirement can be that spraying does not happen. In this way, not only is an audit record of how spraying occurred recorded, but this can be compared against that required. Also, the spray requirements can be used to control how spraying is actually carried out.

In this manner, not only can accurate audit information be recorded relating to what was done compared against what should have been done to mitigate drift, but the aerial vehicle can operate at operational levels that have been found to mitigate drift, and as such the spraying envelope with respect to weather conditions within which spraying can be carried out can be broadened.

In an example, the processing unit is configured to control at least one flying operation of the aerial vehicle. The processing unit is configured to determine at least one instruction for the control of the at least one flying operation of the aerial vehicle. The at least one spray condition relating to the one or more of the at least one spray unit comprises the at least one instruction for the control of the at least one flying operation of the aerial vehicle over the time period.

In this manner, it can be established that the farmer for example was correctly trying to spray in a manner to mitigate drift, but that there could have been a mechanical failure in the boom that meant it did not respond as required. Therefore, a further level of audit accountability is provided.

In an example, determination of at least one instruction for the control of the at least one flying operation of the aerial vehicle comprises utilization of the determined air movement direction relative to the projection of the fore-aft axis onto the ground and the determined air movement speed relative to the ground In an example, the at least one spray requirement condition relating to the one or more of the at least one spray unit comprises a required height of the at least one spray unit above the ground as a function of air movement speed and air movement direction and geographical location in the environment.

In an example, control of the at least one flying operation comprises varying a height of the aerial vehicle above the ground or crop. At least one sensor of the plurality of sensors is configured to provide data from which a height of the aerial vehicle above the ground or crop can be determined. The at least one spray condition relating to the one or more of the at least one spray unit comprises the height of the aerial vehicle above the ground or crop as a function of geographical location over the time period.

In an example, the aerial vehicle comprises at least one actuator. The at least one actuator is configured to operate and/or move the at least one spray unit. The processing unit is configured to determine at least one instruction for the control of the at least one actuator. The at least one spray condition relating to the one or more of the at least one spray unit comprises the at least one instruction for the control of the at least one actuator over the time period.

In an example, the determination of the at least one instruction for the control of the at least one actuator comprises utilization of the determined air movement direction relative to the projection of the fore-aft axis onto the ground and the determined air movement speed relative to the ground.

In an example, the at least one spray unit is movably attached to the aerial vehicle. At least one sensor of the plurality of sensors is configured to provide data from which an angle of the at least one spray unit with respect to a vertical axis can be determined. The at least one actuator comprises at least one first rotator actuator configured to rotate the at least one spray unit by at least one angle of rotation with respect to the vertical axis. The processing unit is configured to determine at least one instruction for the control of one or more of the at least one first rotator actuator to rotate one or more of the at least one spray unit. The at least one spray condition relating to the one or more of the at least one spray unit comprises the at least one instruction for the control of the at least one first rotator actuator over the time period.

In an example, a horizontal axis extends in a direction perpendicular to the fore-aft axis of the aerial vehicle and extends in a direction perpendicular to the vertical axis. At least one sensor of the plurality of sensors is configured to provide data from which an angle of the at least one spray unit with respect to the horizontal axis can be determined. The at least one actuator comprises at least one second rotator actuator configured to rotate the at least one spray unit by at least one angle of rotation with respect to the horizontal axis. The processing unit is configured to determine at least one instruction for the control of one or more of the at least one second rotator actuator to rotate one or more of the at least one spray unit. The at least one spray condition relating to the one or more of the at least one spray unit comprises the at least one instruction for the control of the at least one second rotator actuator over the time period.

In an example, the at least one actuator comprises at least one activation actuator configured to start the at least one spray unit spraying the liquid chemical and configured to stop the at least one spray unit spraying the liquid chemical. The processing unit is configured to determine at least one instruction for the control of one or more of the at least one activation actuator to start and/or stop one or more of the at least one spray unit spraying the liquid chemical. The at least one spray condition relating to the one or more of the at least one spray unit comprises the at least one instruction for the control of the at least one activation actuator over the time period.

In an example, the at least one actuator comprises at least one spray adjustment actuator configured to control a droplet size of the liquid chemical sprayed by the at least one spray unit. The processing unit is configured to determine at least one instruction for the control of one or more of the at least one spray adjustment actuator to vary a drop size of liquid chemical sprayed from one or more of the at least one spray unit. The at least one spray condition relating to the one or more of the at least one spray unit comprises the at least one instruction for the control of the at least one spray adjustment actuator over the time period.

In an example, the at least one spray unit is configured to be moved away from and toward a body of the aerial vehicle. The at least one actuator comprises at least one extension actuator configured to move the at least one spray unit away from and toward the body of the aerial vehicle. The processing unit is configured to determine at least one instruction for the control of the at least one extension actuator. The at least one spray condition relating to the one or more of the at least one spray unit comprises the at least one instruction for the control of the at least one spray extension actuator over the time period In an example, at least one sensor of the plurality of sensors is configured to provide data from which a height of the at least one spray unit above the ground or crop can be determined. The processing unit is configured to determine at least one instruction for the control of the at least one extension actuator to position the at least one spray unit at a height above the ground or crop that depends on a magnitude of the determined air movement speed relative to the ground.

In an example, the processing unit is configured to determine at least one instruction for the control of the at least one extension actuator to position the at least one spray unit at a height above the ground or crop that depends on a magnitude of an air direction angle of the determined air movement direction relative to the projection of the fore-aft axis onto the ground.

According to the above embodiments, it can be established how the aerial vehicle has sprayed the liquid chemical in order to mitigate drift, and why it has operated in that manner on the basis of how the wind has been blowing, thereby provided am audit record. Such a record could enable a farmer to indicate that the aerial vehicle has sprayed requirements, and can also be used to update those requirements if necessary in order that liquid chemicals can be sprayed more effectively, whilst mitigating spray drift.

BRIEF DESCRIPTION OF THE DRAWINGS

Exemplary embodiments will be described in the following, by way of example only, with reference to the following drawings.

DETAILED DESCRIPTION OF EMBODIMENTS

Figure 1:
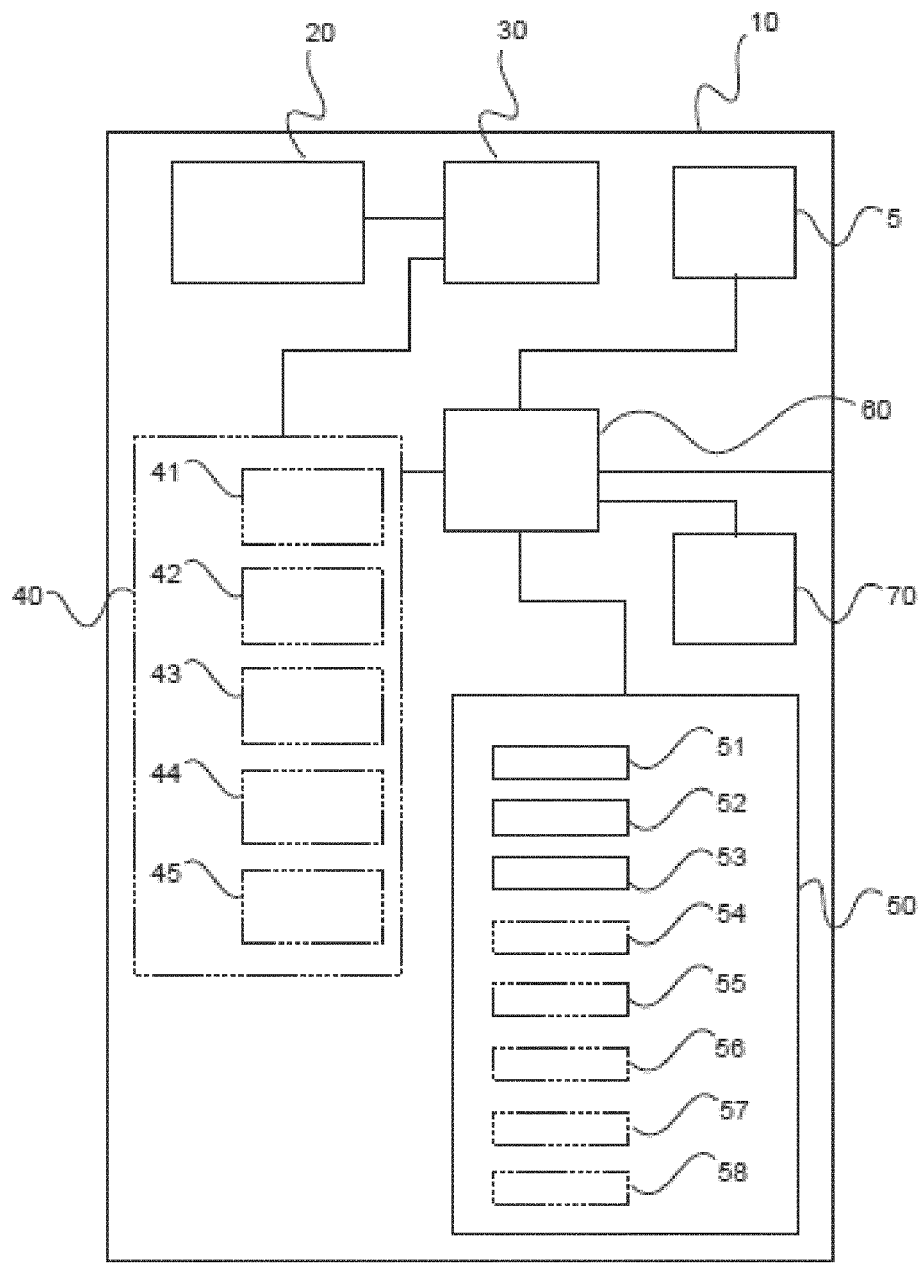
FIG. 1 shows a schematic set up of an example of an aerial vehicle.

FIG. 1 shows an example of an aerial vehicle 10. The aerial vehicle comprises a liquid chemical tank 20, at least one spray unit 30, a plurality of sensors 50, a processing unit 60, and an output unit 70. The liquid chemical tank is configured to hold a liquid chemical. The at least one spray unit is configured to spray the liquid chemical. At least one sensor 51 of the plurality of sensors is configured to measure a speed of the aerial vehicle relative to the ground. At least one sensor 52 of the plurality of sensors is configured to measure an air movement direction relative to the aerial vehicle with respect to a fore-aft axis of the aerial vehicle. At least one sensor 53 of the plurality of sensors is configured to measure an air movement speed relative to the aerial vehicle. The processing unit is configured to determine an air movement direction relative to a projection of the fore-aft axis onto the ground and determine an air movement speed relative to the ground. The determination of the air movement direction relative to a projection of the fore-aft axis onto the ground comprises utilization of the speed of the aerial vehicle, the air movement direction relative to the aerial vehicle with respect to the fore-aft axis of the aerial vehicle and the air movement speed relative to the aerial vehicle. The determination of the an air movement speed relative to the ground comprises utilization of the speed of the aerial vehicle, the air movement direction relative to the aerial vehicle with respect to the fore-aft axis of the aerial vehicle and the air movement speed relative to the aerial vehicle. The processing unit is configured to generate a spray record for an environment within which the aerial vehicle is operating. The spray record comprises: information over a time period of at least one spray condition relating to one or more of the at least one spray unit for the aerial vehicle operating within the environment over the time period, the determined air movement direction relative to the projection of the fore-aft axis onto the ground over the time period, and the determined air movement speed relative to the ground over the time period. The output unit is configured to output the spray record.

According to an example, at least one sensor 58 of the plurality of sensors is configured to determine a geographical location of the aerial vehicle. The spray record can then comprise the geographical location of the aerial vehicle over the time period.

In an example, the at least one sensor comprises a GPS sensor based system.

According to an example, the aerial vehicle comprises an input unit 5. The input unit is configured to receive spray requirement information for the environment. The spray requirement information comprises at least one spray requirement condition relating to one or more of the at least one spray unit as a function of air movement speed and air movement direction and geographical location in the environment. The spray record can then comprise the at least one spray condition relating to the one or more of the at least one spray unit as a function of geographical location over the time period and the at least one spray requirement condition relating to the one or more of the at least one spray unit as a function of geographical location over the time period.

According to an example, the processing unit is configured to control at least one flying operation of the aerial vehicle. The processing unit is configured to determine at least one instruction for the control of the at least one flying operation of the aerial vehicle. The at least one spray condition relating to the one or more of the at least one spray unit can then comprise the at least one instruction for the control of the at least one flying operation of the aerial vehicle over the time period.

According to an example, determination of at least one instruction for the control of the at least one flying operation of the aerial vehicle comprises utilization of the determined air movement direction relative to the projection of the fore-aft axis onto the ground and the determined air movement speed relative to the ground According to an example, the at least one spray requirement condition relating to the one or more of the at least one spray unit comprises a required height of the at least one spray unit above the ground as a function of air movement speed and air movement direction and geographical location in the environment.

According to an example, control of the at least one flying operation comprises varying a height of the aerial vehicle above the ground or crop. At least one sensor 54 of the plurality of sensors is configured to provide data from which a height of the aerial vehicle above the ground or crop can be determined. The at least one spray condition relating to the one or more of the at least one spray unit can then comprise the height of the aerial vehicle above the ground or crop as a function of geographical location over the time period.

According to an example, the aerial vehicle comprises at least one actuator 40. The at least one actuator is configured to operate and/or move the at least one spray unit. The processing unit is configured to determine at least one instruction for the control of the at least one actuator. The at least one spray condition relating to the one or more of the at least one spray unit can then comprise the at least one instruction for the control of the at least one actuator over the time period.

According to an example, the determination of the at least one instruction for the control of the at least one actuator comprises utilization of the determined air movement direction relative to the projection of the fore-aft axis onto the ground and the determined air movement speed relative to the ground.

According to an example, the at least one spray unit is movably attached to the aerial vehicle. At least one sensor 55 of the plurality of sensors is configured to provide data from which an angle of the at least one spray unit with respect to a vertical axis can be determined. The at least one actuator 40 comprises at least one first rotator actuator 41 configured to rotate the at least one spray unit by at least one angle of rotation with respect to the vertical axis. The processing unit is configured to determine at least one instruction for the control of one or more of the at least one first rotator actuator to rotate one or more of the at least one spray unit. The at least one spray condition relating to the one or more of the at least one spray unit can then comprise the at least one instruction for the control of the at least one first rotator actuator over the time period.

According to an example, a horizontal axis extends in a direction perpendicular to the fore-aft axis of the aerial vehicle and extends in a direction perpendicular to the vertical axis. At least one sensor 56 of the plurality of sensors is configured to provide data from which an angle of the at least one spray unit with respect to the horizontal axis can be determined. The at least one actuator 40 comprises at least one second rotator actuator 42 configured to rotate the at least one spray unit by at least one angle of rotation with respect to the horizontal axis. The processing unit is configured to determine at least one instruction for the control of one or more of the at least one second rotator actuator to rotate one or more of the at least one spray unit. The at least one spray condition relating to the one or more of the at least one spray unit can then comprise the at least one instruction for the control of the at least one second rotator actuator over the time period.

According to an example, the at least one actuator 40 comprises at least one activation actuator 43 configured to start the at least one spray unit spraying the liquid chemical and configured to stop the at least one spray unit spraying the liquid chemical. The processing unit is configured to determine at least one instruction for the control of one or more of the at least one activation actuator to start and/or stop one or more of the at least one spray unit spraying the liquid chemical. The at least one spray condition relating to the one or more of the at least one spray unit can then comprise the at least one instruction for the control of the at least one activation actuator over the time period.

According to an example, the at least one actuator 40 comprises at least one spray adjustment actuator 44 configured to control a droplet size of the liquid chemical sprayed by the at least one spray unit. The processing unit is configured to determine at least one instruction for the control of one or more of the at least one spray adjustment actuator to vary a drop size of liquid chemical sprayed from one or more of the at least one spray unit. The at least one spray condition relating to the one or more of the at least one spray unit can then comprise the at least one instruction for the control of the at least one spray adjustment actuator over the time period.

According to an example, the at least one spray unit is configured to be moved away from and toward a body of the aerial vehicle. The at least one actuator 40 comprises at least one extension actuator 45 configured to move the at least one spray unit away from and toward the body of the aerial vehicle. The processing unit is configured to determine at least one instruction for the control of the at least one extension actuator. The at least one spray condition relating to the one or more of the at least one spray unit can then comprise the at least one instruction for the control of the at least one spray extension actuator over the time period According to an example, at least one sensor 57 of the plurality of sensors is configured to provide data from which a height of the at least one spray unit above the ground or crop can be determined. The processing unit is configured to determine at least one instruction for the control of the at least one extension actuator to position the at least one spray unit at a height above the ground or crop that depends on a magnitude of the determined air movement speed relative to the ground.

According to an example, the processing unit is configured to determine at least one instruction for the control of the at least one extension actuator to position the at least one spray unit at a height above the ground or crop that depends on a magnitude of an air direction angle of the determined air movement direction relative to the projection of the fore-aft axis onto the ground.

Thus, as shown in FIG. 1, in an example the aerial vehicle comprises a liquid chemical tank 20, at least one spray unit 30, at least one actuator 40, a plurality of sensors 50, and a processing unit 60. The liquid chemical tank is configured to hold a liquid chemical. The at least one spray unit is configured to spray the liquid chemical. The at least one actuator is configured to operate and/or move the at least one spray unit. At least one sensor 51 of the plurality of sensors is configured to measure a speed of the aerial vehicle relative to the ground. At least one sensor 52 of the plurality of sensors is configured to measure an air movement direction relative to the aerial vehicle with respect to a fore-aft axis of the aerial vehicle. At least one sensor 53 of the plurality of sensors is configured to measure an air movement speed relative to the aerial vehicle. The processing unit is configured to determine an air movement direction relative to a projection of the fore-aft axis onto the ground and determine an air movement speed relative to the ground. The determination comprises utilization of the speed of the aerial vehicle, the air movement direction relative to the aerial vehicle with respect to the fore-aft axis of the aerial vehicle and the air movement speed relative to the aerial vehicle. The processing unit is configured to control at least one flying operation of the aerial vehicle and/or control the at least one actuator. Determination of at least one instruction for the control of the at least one flying operation of the aerial vehicle and/or determination of at least one instruction for the control the at least one actuator comprises utilization of the determined air movement direction relative to the projection of the fore-aft axis onto the ground and the determined air movement speed relative to the ground.

In other words, air speed and air direction are measured with respect to the aerial vehicle's frame of reference that can be moving, and transferred to a stationary frame of reference on the ground, and the determined air speed and direction with respect to the ground is used to control how the aerial vehicle, that can be moving, sprays a chemical liquid.

In this manner, the effect of drift of a sprayed liquid caused by wind can be mitigated through control of the aerial vehicle and/or control of spray units themselves, with this mitigation taking into account the real wind speed and direction. Thus, an aerial vehicle can spray closer to the edge of fields and/or closer to footpaths, or areas that are not to be sprayed, and/or spraying can be conducted at higher aerial vehicle speeds and at higher wind speeds than currently achievable, while remaining within the legally required limits for that spray application operation.

Thus, spray drift can be mitigated taking into account wind direction and speed, and combining the various aspects of drift mitigation (e.g., drift reducing nozzles, spray height, crop foliage density, and off-crop foliage interception).

Reference above to a liquid chemical tank and a liquid chemical, does not preclude there being two tanks holding different liquids or a liquid and a solid, such as a powder, where the contents of those two tanks are then mixed and then sprayed as a liquid chemical. Thus, at one level the liquid chemical tank can be the tube connected to the spray unit that sprays the liquid chemical held in that tube, even if two different fluids, or a fluid and solid, are mixed beforehand and then provided to the connecting tube as the liquid chemical that is then sprayed.

Also, a spray unit refers to a spray device, such as a nozzle, of any description or type.

In an example, the at least one sensor 51 configured to measure a speed of the aerial vehicle relative to the ground comprises a GPS system.

In an example, the at least one sensor 51 configured to measure a speed of the aerial vehicle relative to the ground comprises a laser reflectance based system.

In an example, the at least one sensor 52 configured to measure an air movement direction relative to the aerial vehicle comprises a wind vane.

In an example, the at least one sensor 53 configured to measure an air movement speed relative to the aerial vehicle comprises an anemometer.

In an example, the at least one sensor 53 configured to measure an air movement speed relative to the aerial vehicle comprises a pitot tube.

In an example, control of the at least one flying operation comprises varying a height of the aerial vehicle above the ground or crop.

Thus, in this way as the wind speed and/or direction would lead to more spray drift, for example in a lateral direction perpendicular to a movement direction of the aerial vehicle, the aerial vehicle can fly lower if spray drift is expected to increase, as a consequence of the wind speed increasing and/or the wind direction moving in a direction more perpendicular to the aerial vehicle movement direction, which can become important when an aerial vehicle is spraying at the boundary of a field and is flying parallel to that boundary.

In other words, if the wind speed and direction is such that unwanted spray drift could occur, spraying can be conducted at a reduced height above the ground or height above the crop, leading to less drift as the spray has less time to travel from a spray unit to the ground or crop and thus there is less spray drift.

In an example, at least one sensor 54 of the plurality of sensors is configured to provide data from which a height of the aerial vehicle above the ground or crop can be determined. The processing unit is configured to fly the aerial vehicle to a height above the ground or crop that depends on a magnitude of the determined air movement speed relative to the ground.

In this manner, the spray unit(s) can be positioned at the ideal position to mitigate spray drift, taking into account wind speed.

In an example, the sensor used to determine height is a radar sensor.

In an example, the sensor used to determine height is a laser time of flight sensor.

In an example, the at least one sensor 54 is configured to determine the height of a spray unit above the ground or crop. For example, the spray unit could be moveable with respect to body of the aerial vehicle, for example being mounted on a telescopic extension below the aerial vehicle.

In an example, the processing unit is configured to fly the aerial vehicle at a height above the ground or crop that depends on a magnitude of an air direction angle of the determined air movement direction relative to the projection of the fore-aft axis onto the ground.

In this manner, the spray unit(s) can be positioned at the ideal position to mitigate spray drift, taking into account wind direction.

In an example, the height above the ground or crop at which the aerial vehicle is flown is calculated on the basis of the air movement speed relative to the ground multiplied by the cosine of the air direction angle.

In other words, the effect of cross-winds or a component of wind that is perpendicular to the forward movement direction of the aerial vehicle of spray drift can be mitigated through appropriate control of the height of aerial vehicle and/or control of the spray units themselves.

In an example, the processing unit is configured to fly the aerial vehicle in a downwards direction when the magnitude of the determined air movement speed relative to the ground exceeds one or more threshold values.

In this manner, spraying can continue in a set manner until a wind speed exceeds a set magnitude, and then remedial action can be undertaken for this situation when spray drift can become problematic. This saves energy, and also mitigates the possibility of hunting, where the system could be continuously seeking an optimum setting.

In an example, the one or more threshold values depend upon a magnitude of an air direction angle. The air direction angle is the angle between the determined air movement direction relative to the ground and the projection of the fore-aft axis of the aerial vehicle onto the ground.

In to an example, the one or more threshold values are a plurality of threshold values. A threshold value of the plurality of threshold values is calculated on the basis of a set air movement speed multiplied by the cosine of the air direction angle.

According to an example, the at least one spray unit is movably attached to the aerial vehicle. At least one sensor 55 of the plurality of sensors is configured to provide data from which an angle of the at least one spray unit with respect to a vertical axis can be determined. The at least one actuator 40 comprises at least one first rotator actuator 41 configured to rotate the at least one spray unit by at least one angle of rotation with respect to the vertical axis. The processing unit is configured to control one or more of the at least one first rotator actuator to rotate one or more of the at least one spray unit.

In this way, the spray units can be angles to spray slightly upwind in order to mitigate wind speed and direction that could otherwise cause spray drift.

Thus, the at least one actuator being configured to operate and/or move the at least one spray unit comprises the at least one first rotator actuator being configured to rotate the at least one spray unit.

In an example, a horizontal axis extends in a direction perpendicular to the fore-aft axis of the aerial vehicle and extends in a direction perpendicular to the vertical axis. At least one sensor 56 of the plurality of sensors is configured to provide data from which an angle of the at least one spray unit with respect to the horizontal axis can be determined. The at least one actuator 40 comprises at least one second rotator actuator 42 configured to rotate the at least one spray unit by at least one angle of rotation with respect to the horizontal axis. The processing unit is configured to control one or more of the at least one second rotator actuator to rotate one or more of the at least one spray unit.

Thus, the at least one actuator being configured to operate and/or move the at least one spray unit comprises the at least one second rotator actuator being configured to rotate the at least one spray unit.

In an example, the processing unit is configured to control the at least one first rotator actuator to rotate the at least one spray unit in unison by a same angle of rotation with respect to the vertical axis.

In an example, the processing unit is configured to control the at least one second rotator actuator to rotate the at least one spray unit in unison by a same angle of rotation with respect to the horizontal axis.

In an example, control of the at least one actuator by the processing unit comprises utilization of a magnitude of the determined air movement speed relative to the ground.

In an example, control of the at least one actuator by the processing unit comprises utilization of a magnitude of an air direction angle of the determined air movement direction relative to the projection of the fore-aft axis onto the ground. The air direction angle is the angle between the determined air movement direction relative to the projection of the fore-aft axis onto the ground and the projection of the fore-aft axis of the aerial vehicle onto the ground.

In an example, the at least one angle of rotation with respect to the vertical axis is based at least in part on the air movement speed relative to the ground multiplied by the cosine of the air direction angle.

In an example, the at least one actuator comprises at least one activation actuator 43 configured to start the at least one spray unit spraying the liquid chemical and configured to stop the at least one spray unit spraying the liquid chemical.

Thus, the at least one actuator being configured to operate and/or move the at least one spray unit comprises the at least one activation actuator being configured to stop the at least one spray unit from spraying, and indeed to start it spraying again.

In an example, the processing unit is configured to control one or more of the at least one activation actuator to stop an equivalent number of spray units from spraying the liquid chemical based at least in part on a magnitude of the determined air movement speed relative to the ground.

In this manner, when the wind speed in combination with its direction would lead to a situation where spray from one or more spray units could cause problematic spray drift, those units can be turned off. Thus, for example an aerial vehicle can operate on the margins of a field and gusting wind that would cause spray from spray units to cross over the border of the field can be mitigated by turning off those spray units.

In an example, the processing unit is configured to control one or more of the at least one activation actuator to stop an equivalent number of spray units from spraying the liquid chemical based at least in part on a magnitude of an air direction angle of the determined air movement direction relative to the projection of the fore-aft axis onto the ground. The air direction angle is the angle between the determined air movement direction relative to the projection of the fore-aft axis onto the ground and the projection of the fore-aft axis of the aerial vehicle onto the ground.

In an example, the determination to stop a spray unit from spraying is based at least in part on the air movement speed relative to the ground multiplied by the cosine of the air direction angle.

In an example, the at least one actuator comprises at least one spray adjustment actuator 44 configured to control a droplet size of the liquid chemical sprayed by the at least one spray unit.

Thus, the at least one actuator being configured to operate and/or move the at least one spray unit comprises the at least one spray adjustment actuator being configured to control a droplet sized sprayed by the at least one spray unit.

In an example, the processing unit is configured to control one or more of the at least one spray adjustment actuator to control the droplet size of the liquid chemical sprayed by an equivalent number of spray units based at least in part on a magnitude of the determined air movement speed relative to the projection of the fore-aft axis of the aerial vehicle onto the ground.

In an example, the processing unit is configured to control one or more of the at least one spray adjustment actuator to increase the droplet size on the basis of an increase in the magnitude of the determined air movement speed relative to the ground.

In this manner, as the wind speed and/or direction would otherwise lead to problematic spray drift, the sprayed drop size can be increased in order to mitigate spray drift, because larger spray droplets suffer from less drift in comparison to smaller spray droplets.

In an example, the processing unit is configured to control one or more of the at least one spray adjustment actuator to control the droplet size of the liquid chemical sprayed by an equivalent number of spray units based at least in part on a magnitude of an air direction angle of the determined air movement direction relative to the projection of the fore-aft axis of the aerial vehicle onto the ground. The air direction angle is the angle between the determined air movement direction relative to the projection of the fore-aft axis of the aerial vehicle onto the ground and the projection of the fore-aft axis of the aerial vehicle onto the ground In an example, the droplet size is determined at least in part on the air movement speed relative to the ground multiplied by the cosine of the air direction angle.

In an example, the at least one spray unit is movably attached to the aerial vehicle. The at least one spray unit is configured to be moved away from and toward a body of the aerial vehicle. The at least one actuator comprises at least one extension actuator 45 configured to move the at least one spray unit away from and toward the body of the aerial vehicle. Control of the at least one actuator comprises controlling the at least one extension actuator to vary a height of the at least one spray unit above the ground or crop.

Thus, the at least one actuator being configured to operate and/or move the at least one spray unit comprises the at least one extension actuator being configured to move the at least one spray unit away from and toward the body of the aerial vehicle.

In an example, the spray unit(s) is (are) mounted on a telescopic extendable and retractable mount beneath the aerial vehicle, enabling the distance between the spray unit(s) and body of the aerial vehicle to be varied. Thus, the aerial vehicle can be flown at a constant height above the ground or crop, and at the same time the spray unit's height above the ground or crop can be varied. In this way, as the possibility of spray drift increases, one way to mitigate this is spray from a lower height, by varying the height of the spray unit but keeping the aerial vehicle at an optimum flight height. The liquid sprayed, is then in the air for a reduced time and consequently has less time to drift laterally, thereby mitigating spray drift.

In an example, a sensor measures a distance of the spray unit below the body of the aerial vehicle, and therefore by knowing the height of the body of the aerial vehicle above the ground or crop through use of an appropriate sensor, the height of the spray unit above the ground or crop can be determined.

In an example, at least one sensor 57 of the plurality of sensors is configured to provide data from which a height of the at least one spray unit above the ground or crop can be determined. The processing unit is configured to control the at least one extension actuator to position the at least one spray unit at a height above the ground or crop that depends on a magnitude of the determined air movement speed relative to the ground or crop.

In this manner, the spray unit(s) can be positioned at the ideal position to mitigate spray drift, taking into account wind speed.

In an example, the sensor used to determine height is a radar sensor.

In an example, the sensor used to determine height is a laser time of flight sensor.

In an example, the processing unit is configured to control the at least one extension actuator to position the at least one spray unit at a height above the ground or crop that depends on a magnitude of an air direction angle of the determined air movement direction relative to the projection of the fore-aft axis onto the ground.

In an example, the height above the ground or crop at which the at least one spray unit is positioned is calculated on the basis of the air movement speed relative to the ground multiplied by the cosine of the air direction angle.

In other words, the effect of cross-winds or a component of wind that is perpendicular to the forward movement direction of the aerial vehicle of spray drift can be mitigated through appropriate control of the height of aerial vehicle and/or control of the spray units themselves.

In an example, the processing unit is configured to control the at least one extension actuator to move the at least one spray unit in a downwards direction when the magnitude of the determined air movement speed relative to the ground exceeds one or more threshold values.

In this manner, spraying can continue in a set manner until a wind speed exceeds a set magnitude, and then remedial action can be undertaken for this situation when spray drift can become problematic. This saves energy, and also mitigates the possibility of hunting, where the system could be continuously seeking an optimum setting.

In an example, the one or more threshold values depend upon a magnitude of an air direction angle. The air direction angle is the angle between the determined air movement direction relative to the ground and the projection of the fore-aft axis of the aerial vehicle onto the ground.

In an example, the one or more threshold values are a plurality of threshold values. A threshold value of the plurality of threshold values is calculated on the basis of a set air movement speed multiplied by the cosine of the air direction angle.

In the above, where it is described that the processing unit is configured to control an actuator, and/or a flying operation of the aerial vehicle, this relates to the processing unit determining instructions for that control. For example, the processing unit can determine instructions in the form of signals that are used to operate an actuator. For example, the processing unit can determine instructions for flying the aerial vehicle in a certain manner. This could be in the form of signals that are directly used to fly the aerial vehicle, or in the form of signals that are provided to a dedicated flight control unit that then flies the aerial vehicle as required.

Figure 2:
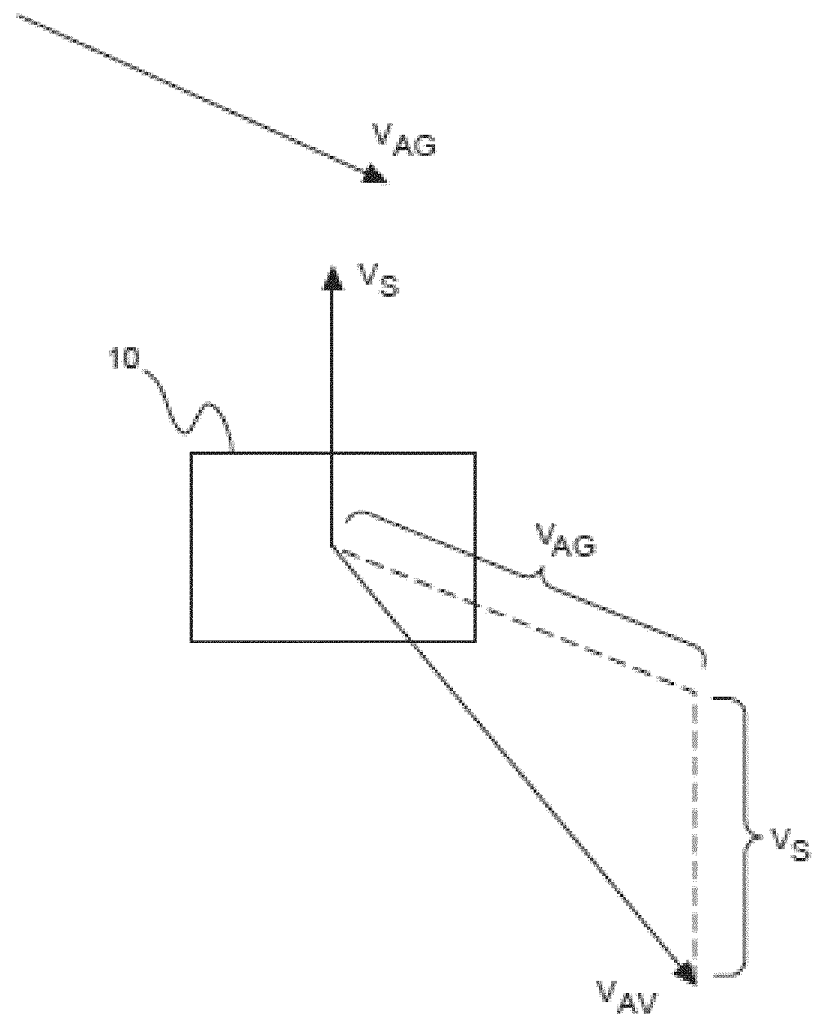
FIG. 2 shows a schematic example of a plan view of an aerial vehicle.

FIG. 2 shows a plan view of an exemplar aerial vehicle 10 flying over and spraying a crop in a field. The aerial vehicle is flying close to, and parallel to, a boundary of the field, and the wind is blowing with a component towards the boundary. The vehicle is flying with a speed Vs and the wind is blowing in a particular direction and with a velocity $V_{AG}$. The aerial vehicle has an anemometer and a wind vane to determine both the direction and speed of the wind, with respect to the aerial vehicle—in other words in the reference from of the aerial vehicle. Due to the movement of the aerial vehicle, the measured wind direction and wind speed have both been distorted from their true ground based values, as shown. Thus, the wind speed measured at the aerial vehicle has been distorted to $V_{AV}$. A vector based analysis can however be used to determine the real ground based wind direction and wind speed. In this way, the component of the wind speed towards the boundary of the field, in terms of the ground, can be determined. Then, the processing unit of the aerial vehicle can position its spray units closer to the ground or crop if the wind is too strong and its direction would lead to lateral drift, and/or the processing unit can control the spray units themselves, to spray larger drops that are less susceptible to drift or angle the spray units into the wind. The aerial vehicle can move the spray units closer to the ground or crop by flying closer to the ground or crop and/or by extending the spray units away from its body in a downwards direction. The absolute velocity of the vehicle with respect to the sprayed liquid has been found to be not particularly important. This is because the sprayed liquid initially sprayed has a forward velocity equal to that of the aerial vehicle, but the spray is very rapidly slowed down and then falls under gravity at a speed governed by drag from the air and is globally carried by the moving air—the wind. The required positioning of the boom as a function of wind speed, wind direction and position of the vehicle in the field has already been downloaded to the vehicle, and whilst spraying the vehicle records the conditions under which the spray has been applied. Thus, in this way spray can be applied correctly in conditions that accounts for the specific weather conditions and where spray is being applied, and at the same time a detailed audit record is provided. Thus, the vehicle measures the wind speed and direction, and depending upon where it is in the field, sprays appropriately to mitigate the effects of drift. The conditions under which spraying is conducted are recorded and output, and these are logged against the requirements for spraying. Thus, an audit record is provided, and spraying can be conducted in an optimum manner under all possible conditions right up to the boundaries of possibility. At the same time, the spraying can be examined to determine if the requirements for spraying are too lenient or too stringent, thus providing for an effective feedback tool to further improve spraying.

Thus, the following situations can apply, and where the aerial vehicle takes appropriate action in order to mitigate the effects of spray drift. Thus, the wind has a wind speed that has a component blowing perpendicular to the vehicle's forward direction. This component of wind speed is $V_{AG1}$. The processing unit has flown the aerial vehicle slightly downwards, however to fly further downwards would position it too close to the crop. Thus, the processing unit has controlled an actuator to extend the spray units downwards, such that the spray units are positioned a distance above ground or crop equal to $H_1$. This distance, for this position in the field, has been determined to be optimal in that spray drift has been determined not to be problematic and will not be blown over the boundary. The wind is however gusting in terms of a wind speed varying and/or a wind direction changing, and now the component of the wind speed perpendicular to the forward direction has increased to a value $V_{AG2}$. In this example, the processing unit mitigates the effect of drift, that would otherwise occur, by further lowering spray units to a height $H_2$, where it has been determined that there will be less drift, and at the same time angles the spray units slightly into the wind in order that the spray immediately leaving the spray units is being sprayed slightly upwind. Spray drift is mitigated due to the spray droplets having less distance to travel before reaching the target to be sprayed, and therefore there is less lateral drift. As the wind gusts further to a cross component having a speed $V_{AG3}$, the processing unit determines that the spray unit cannot be lowered further or angled to mitigate spray drift, and therefore controls the spray units to spray droplets having a larger size. These more massive droplets have increased mass with respect to their cross sectional area, and fall faster under gravity than smaller droplets and therefore do not get carried as far laterally with the wind before they reach the ground or crop, thereby mitigating spray drift.

While embodiments of the invention have been illustrated and described in detail in the exemplary drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An aerial vehicle, comprising:
a liquid chemical tank configured to hold a liquid chemical;
at least one spray unit configured to spray the liquid chemical;
a plurality of sensors comprising:
a first sensor configured to measure a speed of the aerial vehicle relative to the ground,
a second sensor configured to measure an air movement direction relative to the aerial vehicle with respect to a fore-aft axis of the aerial vehicle,
a third sensor configured to measure an air movement speed relative to the aerial vehicle, and
a fourth sensor configured to provide data from which a height of the aerial vehicle above the ground or a crop can be determined;
a processing unit configured to:
determine an air movement direction relative to a projection of the fore-aft axis onto the ground and determine an air movement speed relative to the ground, the determination comprising utilization of the speed of the aerial vehicle, the air movement direction relative to the aerial vehicle with respect to the fore-aft axis of the aerial vehicle and the air movement speed relative to the aerial vehicle,
generate a spray record for an environment within which the aerial vehicle is operating, the spray record comprising:
information over a time period of at least one spray condition relating to one or more of the at least one spray unit for the aerial vehicle operating within the environment over the time period, wherein the at least one spray condition relating to the one or more of the at least one spray unit comprises at least one instruction for controlling at least one flying operation of the aerial vehicle over the time period and the height of the aerial vehicle above the ground or crop as a function of geographical location over the time period;
the determined air movement direction relative to the projection of the fore-aft axis onto the ground over the time period; and
the determined air movement speed relative to the ground over the time period, and
control at least one flying operation of the aerial vehicle, wherein control of the at least one flying operation comprises varying a height of the aerial vehicle above the ground or crop; and
an output unit configured to output the spray record.

2. The aerial vehicle of claim 1, wherein the plurality of sensors comprises a sensor configured to determine a geographical location of the aerial vehicle, and wherein the spray record comprises the geographical location of the aerial vehicle over the time period.

3. The aerial vehicle of claim 2, wherein the aerial vehicle comprises an input unit, wherein the input unit is configured to receive spray requirement information for the environment, wherein the spray requirement information comprises at least one spray requirement condition relating to one or more of the at least one spray unit as a function of air movement speed and air movement direction and geographical location in the environment, and wherein the spray record comprises the at least one spray condition relating to the one or more of the at least one spray unit as a function of geographical location over the time period and the at least one spray requirement condition relating to the one or more of the at least one spray unit as a function of geographical location over the time period.

4. The aerial vehicle of claim 1, wherein determination of at least one instruction for the control of the at least one flying operation of the aerial vehicle comprises utilization of the determined air movement direction relative to the projection of the fore-aft axis onto the ground and the determined air movement speed relative to the ground.

5. The aerial vehicle of claim 1, wherein the at least one spray requirement condition relating to the one or more of the at least one spray unit comprises a required height of the at least one spray unit above the ground as a function of air movement speed and air movement direction and geographical location in the environment.

6. The aerial vehicle of claim 1, wherein the aerial vehicle comprises at least one actuator, wherein, the at least one actuator is configured to operate and/or move the at least one spray unit; wherein the processing unit is configured to determine at least one instruction for control of the at least one actuator, and wherein the at least one spray condition relating to the one or more of the at least one spray unit comprises the at least one instruction for control of the at least one actuator over the time period.

7. The aerial vehicle of claim 6, wherein the determination of the at least one instruction for control of the at least one actuator comprises utilization of the determined air movement direction relative to the projection of the fore-aft axis onto the ground and the determined air movement speed relative to the ground.

8. The aerial vehicle of claim 6, wherein the at least one spray unit is movably attached to the aerial vehicle, wherein the plurality of sensors comprises a sensor configured to provide data from which an angle of the at least one spray unit with respect to a vertical axis can be determined; and wherein the at least one actuator comprises at least one first rotator actuator configured to rotate the at least one spray unit by at least one angle of rotation with respect to the vertical axis, and wherein the processing unit is configured to determine at least one instruction for control of one or more of the at least one first rotator actuator to rotate one or more of the at least one spray unit; and wherein the at least one spray condition relating to the one or more of the at least one spray unit comprises the at least one instruction for control of the at least one first rotator actuator over the time period.

9. The aerial vehicle of claim 8, wherein a horizontal axis extends in a direction perpendicular to the fore-aft axis of the aerial vehicle and extends in a direction perpendicular to the vertical axis; wherein the plurality of sensors comprises a sensor configured to provide data from which an angle of the at least one spray unit with respect to the horizontal axis can be determined; and wherein the at least one actuator comprises at least one second rotator actuator configured to rotate the at least one spray unit by at least one angle of rotation with respect to the horizontal axis, and wherein the processing unit is configured to determine at least one instruction for control of one or more of the at least one second rotator actuator to rotate one or more of the at least one spray unit; and wherein the at least one spray condition relating to the one or more of the at least one spray unit comprises the at least one instruction for the control of the at least one second rotator actuator over the time period.

10. The aerial vehicle of claim 6, wherein the at least one actuator comprises at least one activation actuator configured to start the at least one spray unit spraying the liquid chemical and configured to stop the at least one spray unit spraying the liquid chemical, and wherein the processing unit is configured to determine at least one instruction for control of one or more of the at least one activation actuator to start and/or stop one or more of the at least one spray unit spraying the liquid chemical; and wherein the at least one spray condition relating to the one or more of the at least one spray unit comprises the at least one instruction for control of the at least one activation actuator over the time period.

11. The aerial vehicle of claim 6, wherein the at least one actuator comprises at least one spray adjustment actuator configured to control a droplet size of the liquid chemical sprayed by the at least one spray unit, and wherein the processing unit is configured to determine at least one instruction for control of one or more of the at least one spray adjustment actuator to vary a droplet size of liquid chemical sprayed from one or more of the at least one spray unit; and wherein the at least one spray condition relating to the one or more of the at least one spray unit comprises the at least one instruction for control of the at least one spray adjustment actuator over the time period.

12. The aerial vehicle of claim 6, wherein the at least one spray unit is configured to be moved away from and toward a body of the aerial vehicle, and wherein the at least one actuator comprises at least one extension actuator configured to move the at least one spray unit away from and toward the body of the aerial vehicle, wherein the processing unit is configured to determine at least one instruction for control of the at least one extension actuator; and wherein the at least one spray condition relating to the one or more of the at least one spray unit comprises the at least one instruction for control of the at least one spray extension actuator over the time period.

13. The aerial vehicle of claim 12, wherein the plurality of sensors comprises a sensor configured to provide data from which a height of the at least one spray unit above the ground or crop can be determined, and wherein the processing unit is configured to determine at least one instruction for control of the at least one extension actuator to position the at least one spray unit at a height above the ground or crop that depends on a magnitude of the determined air movement speed relative to the ground.

14. The aerial vehicle of claim 13, wherein the processing unit is configured to determine at least one instruction for control of the at least one extension actuator to position the at least one spray unit at a height above the ground or crop that depends on a magnitude of an air direction angle of the determined air movement direction relative to the projection of the fore-aft axis onto the ground.

* * * * *